United States Patent
Forsberg

(10) Patent No.: US 9,624,938 B2
(45) Date of Patent: Apr. 18, 2017

(54) INTEGRATED MOTOR BEARING AND ROTOR

(71) Applicant: Michael A. Forsberg, Claremore, OK (US)

(72) Inventor: Michael A. Forsberg, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 895 days.

(21) Appl. No.: 14/020,034

(22) Filed: Sep. 6, 2013

(65) Prior Publication Data

US 2014/0079575 A1  Mar. 20, 2014

Related U.S. Application Data

(60) Provisional application No. 61/701,033, filed on Sep. 14, 2012.

(51) Int. Cl.
| | |
|---|---|
| *H02K 7/08* | (2006.01) |
| *F04D 29/041* | (2006.01) |
| *F04D 13/10* | (2006.01) |
| *F04D 29/047* | (2006.01) |
| *E21B 43/12* | (2006.01) |

(52) U.S. Cl.
CPC .......... *F04D 29/041* (2013.01); *E21B 43/128* (2013.01); *F04D 13/10* (2013.01); *F04D 29/0473* (2013.01); *H02K 7/088* (2013.01)

(58) Field of Classification Search
CPC .......... H02K 17/16; H02K 7/088; H02K 1/02; H02K 1/06; F04D 13/10; F04D 29/0473
USPC ....................... 310/90, 88, 89, 114, 403, 406
See application file for complete search history.

(56) References Cited

U.S. PATENT DOCUMENTS

| | | | |
|---|---|---|---|
| 5,945,761 A * | 8/1999 | Sakuma | H02K 1/06 310/168 |
| 6,099,271 A | 8/2000 | Brookbank | |
| 6,566,774 B2 | 5/2003 | Parmeter et al. | |
| 6,956,310 B1 | 10/2005 | Knox | |
| 7,780,242 B2 | 8/2010 | Sollami | |
| 2009/0108712 A1* | 4/2009 | Holtzapple | H02K 21/125 310/216.004 |
| 2011/0070099 A1* | 3/2011 | Schlenhoff | F04D 29/047 417/53 |
| 2012/0098369 A1* | 4/2012 | Auten | F03B 13/10 310/90.5 |

* cited by examiner

*Primary Examiner* — Terrance Kenerly
(74) *Attorney, Agent, or Firm* — Bracewell LLP; James E. Bradley

(57) ABSTRACT

An electric submersible well pump assembly includes a rotary pump and an electrical motor. The motor has a motor housing filled with a dielectric lubricant. A stator formed of a stack of stator disks with a stator bore is stationarily mounted within the motor housing. A motor shaft extends through the bore. A rotor is mounted to the shaft for rotating the shaft and has a stack of rotor disks. Axially spaced-apart radial stabilizing portions along the rotor have outer peripheries that are greater in outer diameter than remaining portions of the rotor. The outer peripheries of the stabilizing portions rotate with the rotor and are closely spaced to the inner diameter of the stator to radially stabilize the shaft.

11 Claims, 3 Drawing Sheets

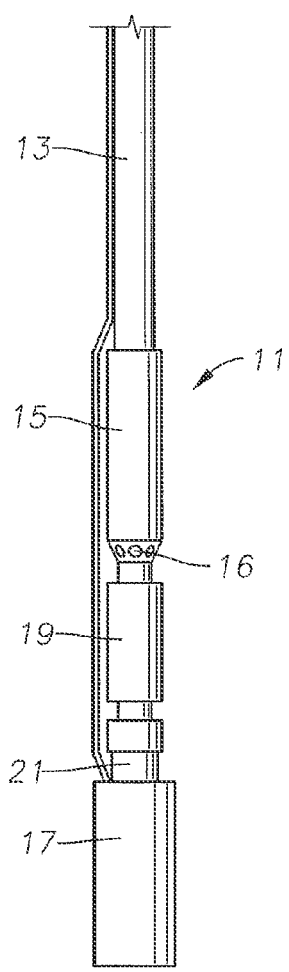
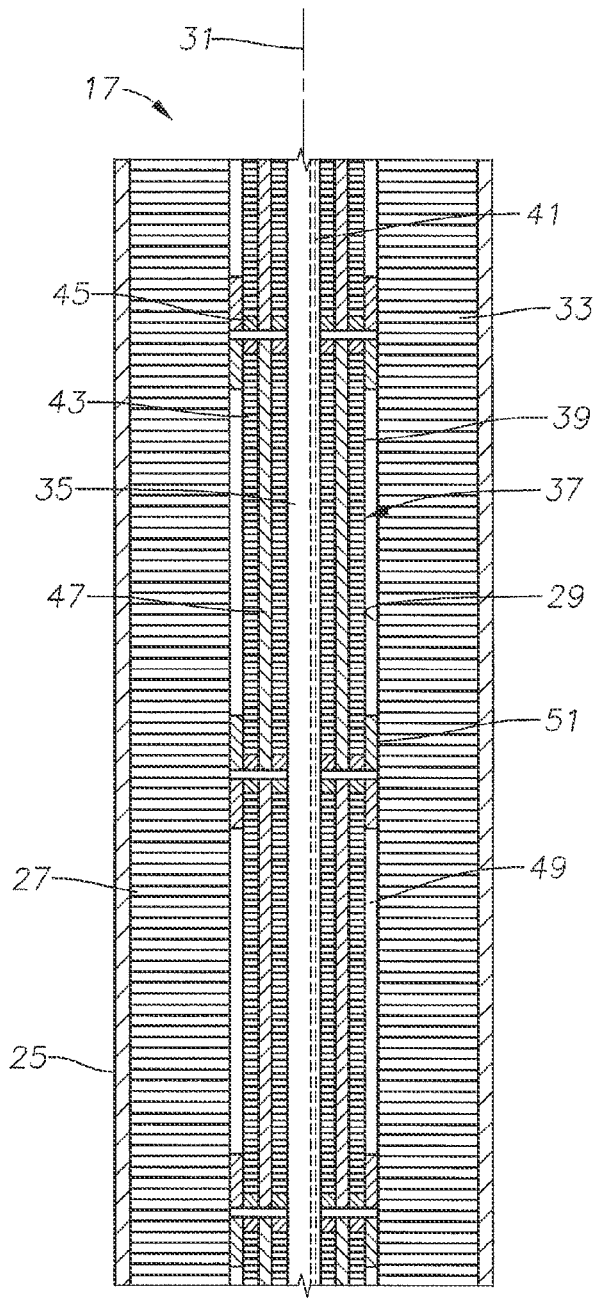
FIG. 1
FIG. 2

INTEGRATED MOTOR BEARING AND ROTOR

CROSS-REFERENCE TO RELATED APPLICATION

This application claims priority to provisional application 61/701,033, filed Sep. 14, 2012.

FIELD OF THE DISCLOSURE

This disclosure relates in general to electrical submersible pumps for wells and in particular to radial stabilizing features in the motor to radially stabilize the shaft and rotor.

BACKGROUND

Electrical submersible pumps (ESP) are widely used to pump oil production wells. A typical ESP has a rotary pump driven by an electrical motor. A seal section is located between the pump and the motor to reduce the differential between the well fluid pressure on the exterior of the motor and the lubricant pressure within the motor. A drive shaft, normally in several sections, extends from the motor through the seal section and into the pump for rotating the pump. The pump may be a centrifugal pump having a large number of stages, each stage having an impeller and diffuser.

A typical ESP motor has a motor housing that surrounds a lamination stack, or stator, which in turn defines a stator bore. The stator bore contains a plurality of stacked rotor sections, each mounted on a motor shaft for rotating the shaft. The motor housing and stator lamination stack are stationary, and the rotor sections and motor shaft rotate relative thereto. An annular gap is located between the rotor sections and the stator lamination stack. Normally, the motor, including the gap, is filled with a dielectric motor lubricant.

Typically, the ESP motor is oriented vertically in a well bore. Accordingly, the rotor sections require lateral support within the stator bore. Generally, this lateral support is provided by radial bearings. The bearings are separate from and positioned between the rotor sections. Each bearing includes an outer bushing that contacts the inner edges of the stator laminations to prevent rotation of the outer bushing relative to the stator laminations. Each bearing has an inner sleeve that rotates with the shaft and is in sliding engagement with the outer bushing.

While these motor bearings work well, they add to the component cost to the motor. Also, additional time is required to install the bearings while assembling the motor.

SUMMARY

The ESP motor has a motor housing filled with a dielectric lubricant. A stator formed of a stack of stator disks is mounted within the motor housing, the stator having an inner diameter defining a stator bore. A motor shaft extends through the bore. A rotor is mounted to the shaft for rotating the shaft and comprises a stack of rotor disks. Axially spaced-apart radial stabilizing portions are located along the rotor. Each radial stabilizing portion has an outer periphery that is greater in outer diameter than remaining portions of the rotor. The outer peripheries of the stabilizing portions rotate with the rotor and are closely spaced to the inner diameter of the stator to radially stabilize the shaft. Preferably, the outer peripheries of the stabilizing portions are separated from inner edges of some of the stator disks by a small gap that creates a liquid film of the lubricant during operation.

In the preferred embodiments, the rotor is made up rotor sections, each of the rotor sections comprising a plurality of the rotor disks secured together as a unit and having upper and lower ends. The stabilizing portions are located at the upper and lower ends of at least some of the rotor sections. In one embodiment, each of the stabilizing portions comprises a metal sleeve mounted to the rotor section for rotation therewith.

Normally, the rotor disks are sandwiched between with upper and lower end rings. Electrically conductive rods extend through the rotor disks, are spaced around the shaft and joined to the end rings. The metal sleeve encircles at least one of the end rings and the outer edges of the rotor disks next to the end rings of at least some of the rotor sections. Preferably, each of the sleeves has a greater axial dimension than an axial thickness of each of the end rings.

Alternately, the rotor disks of the rotor may comprise larger diameter rotor disks and smaller diameter rotor disks having a smaller outer diameter than the larger diameter rotor disks. The stabilizing portions comprise the larger diameter rotor disks.

In another alternate embodiment, the rotor is made up of larger diameter and smaller diameter rotor sections. All of the rotor disks within the larger diameter rotor sections have larger outer diameters than the rotor disks within the smaller diameter rotor sections. The stabilizing portions comprise the larger diameter rotor sections. The larger diameter rotor sections alternate with the smaller diameter rotor sections.

BRIEF DESCRIPTION OF THE DRAWINGS

The present technology will be better understood on reading the following detailed description of nonlimiting embodiments thereof, and on examining the accompanying drawings, in which:

FIG. 1 is a side view of an electric submersible pump assembly having a motor containing radial stabilization features in accordance with this disclosure.

FIG. 2 is a partial side cross-sectional view of the motor of FIG. 1.

DETAILED DESCRIPTION OF THE DISCLOSURE

Figure 3:
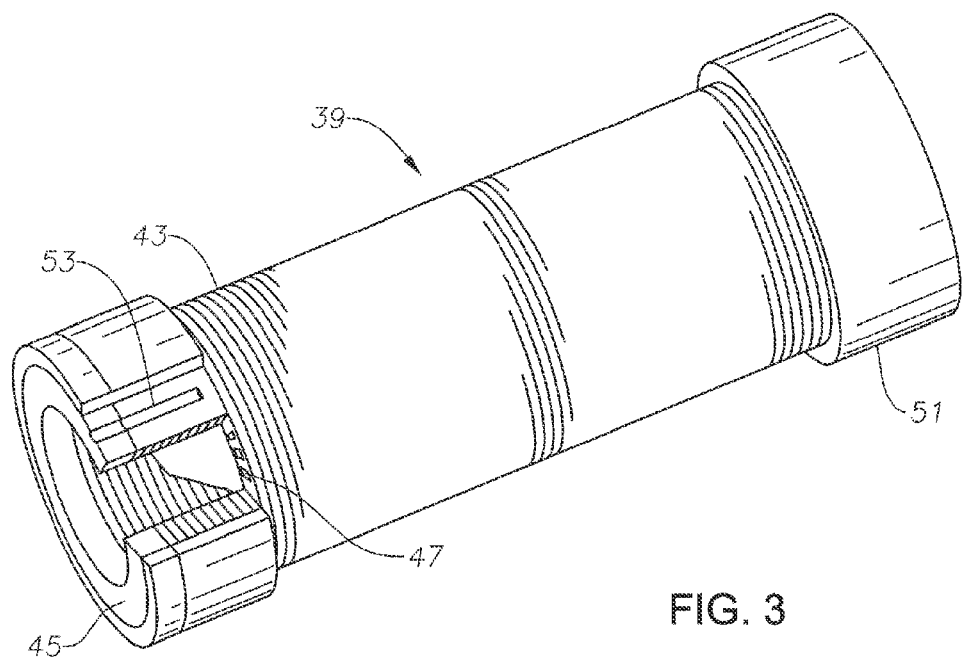
FIG. 3 is a partially sectioned perspective view of one of the rotor sections of the motor of FIG. 2.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, it is to be understood that the specific terminology is not limiting, and that each specific term includes equivalents that operate in a similar manner to accomplish a similar purpose.

Referring to FIG. 1, electrical submersible pump assembly (ESP) 11 is illustrated as being supported on production tubing 13 extending into a well. Alternately, ESP 11 could be supported by other structure, such as coiled tubing. ESP 11 includes several modules, one of which is a rotary pump 15 that is illustrated as being a centrifugal pump. Alternately, pump 15 could be another type, such as a progressing cavity pump. Pump 15 has an intake 16 for drawing in well fluid. Another module is an electrical motor 17, which drives pump 15 and is normally a three-phase AC motor. A third module comprises a protective member or seal section 19 coupled between pump 15 and motor 17. Seal section 19 has components to reduce a pressure differential between dielectric lubricant contained in motor 17 and the pressure of the well fluid on the exterior of ESP 11. Intake 16 may be located in an upper portion of seal section 19 or on a lower end of pump 15. A thrust bearing 21 for motor 17 may be in a separate module or located in seal section 19 or motor 17.

ESP 11 may also include other modules, such as a gas separator for separating gas from the well fluid prior to the well fluid flowing into pump 15. The various modules may be shipped to a well site apart from each other, then assembled with bolts or other types of fasteners.

Referring now to FIG. 2, motor 17 has a motor housing 25 that encloses a stator 27, which has a bore 29 concentric with a motor axis 31. Stator 27 comprises a stack of stator disks or laminations 33, which are thin electrically conductive plates, typically of a steel alloy. Electrical conductors (not shown) are wound through slots in the stack of stator disks 33. Stator 27 is fixed in housing 25 to prevent rotation relative to the housing. A rotatable shaft 35 extends through stator bore 29 along axis 31.

A rotor 37 is mounted on shaft 35 within bore 29. Rotor 37 comprises a plurality of rotor sections 39, each mounted on shaft 35 by a key (not shown) engaging an axially extending keyway 41 on shaft 35 for causing rotation of shaft 35. Each rotor section 39 comprises a stack of rotor disks 43, which are electrically conductive plates about the same thickness as stator disks 33, such as approximately 1/16 inch. Rotor disks 43 may be of a steel alloy that is the same as stator disks 33. Rotor disks 43 of each rotor section 39 are assembled or sandwiched as a unit between end plates or rings 45 at the upper and lower ends of each rotor section 39. Each end ring 45 is formed of a conductive metal, such as copper. Electrically conductive bars or rods 47 extend between and are secured to end rings 45, such as by bradding. Rods 47 are parallel with axis 31 and spaced around shaft 35. Rods 47 may be of copper, and a typical number of rods 47 in each rotor section 39 is 22. Rods 47 extend through aligned holes in rotor disks 43. A typical length for each rotor section 39 is about one to two feet.

In the FIG. 2 embodiment, the outer diameter of rotor disks 43 is constant and is less than the inner diameter of stator bore 29, creating an annular gap 49 between rotor disks 43 and stator 27. Gap 49 helps to prevent frictional forces from developing between the rotating rotor 37 and the stationary stator 27. Gap 49, as well as other spaces in motor housing 25, are filled with a dielectric lubricant. A typical dimension for gap 49 on each side is about 0.020 to 0.040 inch.

Motor 17 is often oriented vertically in a well bore, and it can be quite lengthy. For example, although the motor diameter is often only 4 or 5 inches, the length may be 20 to 30 feet or more. Accordingly, rotor 37 requires lateral support within the stator bore 29. A lateral or radial support system is built into rotor 37. In the embodiment of FIGS. 2 and 3, sleeves 51 are inserted over the ends of rotor sections 39 and fixed for rotation with each rotor section 39. Each sleeve 51 has an outer periphery that is larger in outer diameter than rotor disks 43 and end rings 45. For example, the outer diameter of each sleeve 51 may be only about 0.002 inch on a side less than the inner diameter of stator 27. In such an arrangement, sleeves 51 act as bearings, and stator bore 29 acts as a journal.

Sleeves 51 may be attached in various manners to rotor sections 39. Referring to FIG. 3, each sleeve 51 fits closely around one of the end rings 45 and several of the rotor disks 43 next to each end plate 45. Sleeve 51 has an axial dimension that is preferably greater than the axial dimension of each end plate 45, so that the inner diameter of sleeve 51 encloses not only one of the end rings 45, but also a number of the rotor disks 43, such as 20-25. As an example, sleeve 51 may have an axial dimension of one to two inches. Sleeve 51 may be installed around end plate 45 and some of the rotor disks 43 by a heat-shrinking process. In one example, a slot or keyway 53 extends axially along the outer diameter of end plate 45 and several of the rotor disks 43. Keyway 53 matches a mating keyway (not shown) in the inner diameter of sleeve 51 to receive a key and rotationally lock sleeve 51 to rotor section 39.

Rotor sections 39 are installed by inserting each into stator bore 29 and sliding each rotor section over shaft 35. The opposite ends of rotor 37 are secured conventionally, such as by retainer rings, to shaft 35 so that rotor 37 is axially fixed with shaft 35. The end rings 45 of adjacent rotor sections 39 may abut each other.

During operation, electrical power supplied to the windings within stator 27 causes rotor 37 to rotate, which in turn causes shaft 35 to rotate. The thin gap between rotating sleeves 51 and the inner edges of stator disks 33 creates a liquid film of the dielectric lubricant. Also, sleeves 51 will be in sliding engagement or contact from time to time with the inner edges of stator disks 33. To reduce wear on stator disks 33, preferably, each sleeve 51 is formed of a softer material than stator disks 33, and one that is typically used for bearings, such as bronze.

Figure 4:
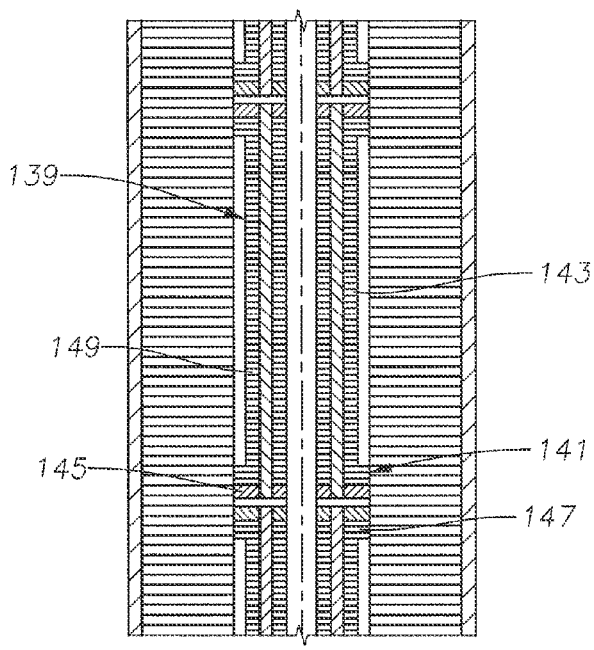
FIG. 4 is a partial sectional view of an alternate embodiment of the motor of FIG. 2.

Referring to FIG. 4, an alternative embodiment include arrangements where, rather than sleeves, the outer diameter of each of the rotor sections 139 is greater at its ends 141 than in the intermediate area 143 between the ends 141. The outer diameters of the end rings 145 and several of the rotor disks 147 next to the end rings 145 would be the same as the outer diameter of sleeves 51 (FIGS. 2 and 3). Larger outer diameter rotor disks 147 would be larger in outer diameter than smaller outer diameter rotor disks 149 in the intermediate area between ends 141. Rotor sections 139 could be formed by making the entire rotor section 139 larger, then machining down intermediate portion 143. Alternately, rotor sections 139 could be formed by employing end rings 145 and rotors disks 147 larger in diameter than smaller diameter rotor disks 149. Components not numbered or mentioned in FIG. 4 are the same as in FIGS. 2 and 3.

Figure 5:
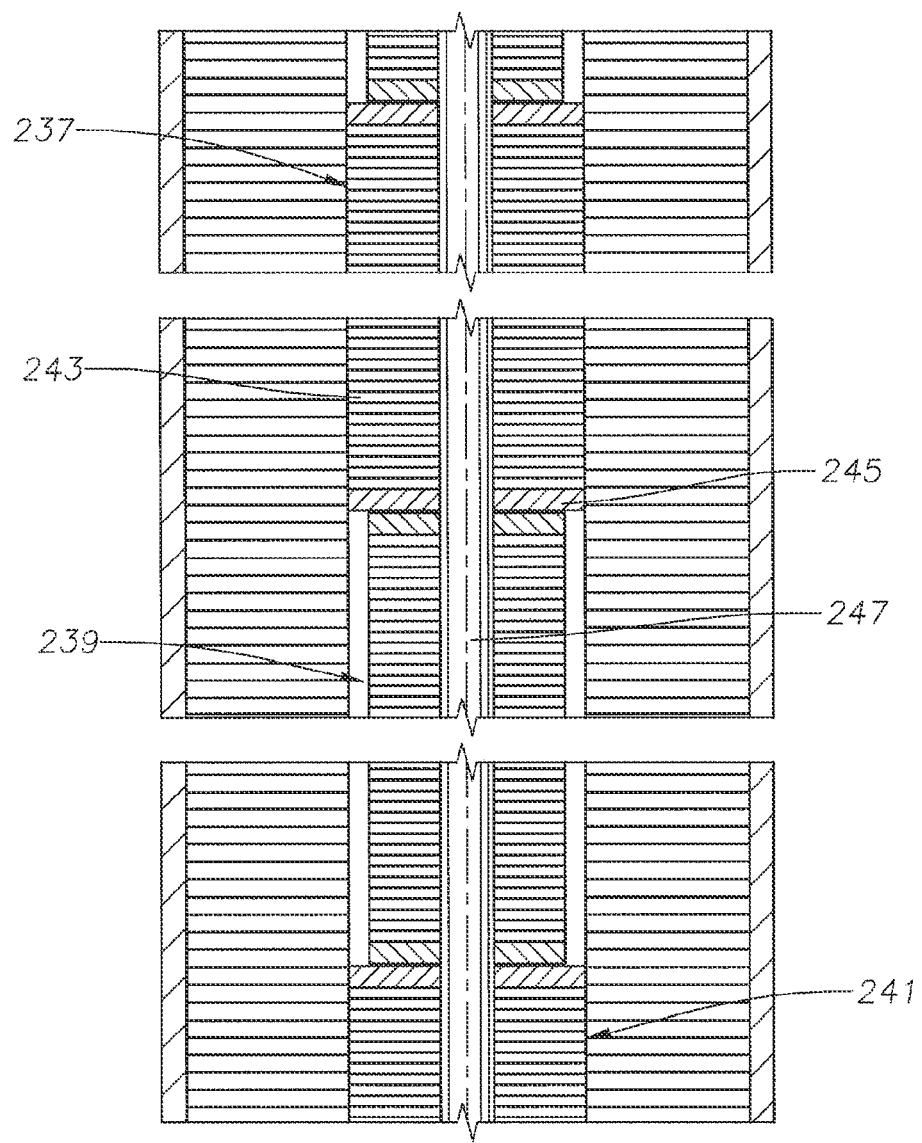
FIG. 5 is a partial sectional view of another alternate embodiment of the motor of FIG. 2.

In the second alternate embodiment of FIG. 5, rotor 237 is made up of a number of smaller diameter rotor sections 239 and larger diameter rotor sections 241. Larger diameter rotor sections 241 have a constant outer diameter throughout their lengths that is greater than the constant outer diameter of smaller diameter rotor sections 239. The outer diameter of all of the rotor disks 243 and the end rings 245 in larger diameter rotor sections 241 is preferably the same as the outer diameter of sleeves 51 (FIGS. 2 and 3). The constant outer diameter of smaller diameter rotor sections 239 is preferably the same as the rotor disks 43 and end rings 45 of FIGS. 2 and 3. Preferably, larger diameter rotor sections 241 alternate with smaller diameter rotor sections 239 along the length of shaft 247. The components in FIG. 5 not mentioned are the same as those in FIGS. 2 and 3.

The arrangements shown in FIGS. 2-5 are advantageous because they eliminate the need for radial bearings between the rotor sections. The lengths of the rotor sections optionally can be longer than in the prior art. For shorter motors, an entire rotor could have axially spaced apart radial support portions without having separate unitized rotors sections.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology.

The invention claimed is:

1. An electric submersible well pump assembly, comprising:
   a rotary pump;
   an electrical motor connected to the pump for lowering into a well, the motor comprising:
   a motor housing filled with a dielectric lubricant and having a longitudinal axis;
   a stator formed of a stack of stator disks mounted within the motor housing, the stator having an inner diameter defining a stator bore;
   a motor shaft extending through the bore;
   a rotor mounted to the shaft for rotation therewith and comprising a stack of rotor disks;
   axially spaced-apart radial stabilizing portions along the rotor having outer peripheries that are greater in outer diameter than remaining portions of the rotor, the outer peripheries of the stabilizing portions rotating with the rotor and being closely spaced to the inner diameter of the stator to radially stabilize the shaft; wherein:
   the rotor is made up of larger diameter rotor sections alternating with smaller diameter rotor sections, each of the rotor sections comprising a plurality of the rotor disks, the rotor disks within the larger diameter rotor sections having larger outer diameters than the rotor disks within the smaller diameter rotor sections; and
   the rotor disks of the larger diameter rotor sections serve as the stabilizing portions.

2. The assembly according to claim 1, wherein:
   all of the rotor disks within the larger diameter rotor sections have larger outer diameters than the rotor disks within the smaller diameter rotor sections.

3. The assembly according to claim 1, wherein:
   the rotor disks of the larger outer diameter rotor sections are secured together as a unit; and
   the rotor disks of the smaller outer diameter rotor sections are secured together as a unit.

4. The assembly according to claim 1, wherein the rotor disks of the larger outer diameter rotor sections have a same axial thickness as the rotor disks of the smaller outer diameter rotor sections.

5. The assembly according to claim 1, wherein outer peripheries of the rotor disks of the larger outer diameter rotor sections are spaced from inner edges of the stator disks by a small gap that creates a liquid film with the lubricant during operation.

6. An electric submersible well pump assembly, comprising:
   a rotary pump;
   an electrical motor connected to the pump for lowering into a well, the motor comprising:
   a motor housing filled with a dielectric lubricant and having a longitudinal axis;
   a stator formed of a stack of stator disks mounted within the motor housing, the stator having an inner diameter defining a stator bore;
   a motor shaft extending through the bore;
   a rotor mounted to the shaft for rotation therewith and comprising a stack of rotor disks;
   a plurality of axially spaced-apart metal sleeves mounted to the rotor for rotation therewith, each of the sleeves having an outer diameter larger than the rotor disks to radially stabilize the shaft; and
   wherein each of the sleeves has a greater axial dimension than any of the rotor disks.

7. The assembly according to claim 6, wherein:
   the rotor is made up of rotor sections, each of the rotor sections comprising a plurality of the rotor disks sandwiched between with upper and lower end rings, each of the rotor sections having conductive rods extending through the rotor disks, spaced around the shaft and joined to the end rings;
   each of the metal sleeves circles at least one of the end rings and outer edges of the rotor disks next to the end rings of at least some of the rotor sections; and
   each of the sleeves has a greater axial dimension that an axial thickness of each of the end rings.

8. The assembly according to claim 6, wherein:
   the rotor is made up of rotor sections, each of the rotor sections comprising a plurality of the rotor disks sandwiched between upper and lower end rings, each of the rotor sections having conductive rods extending through the rotor disks, spaced around the shaft and joined to the end rings; and
   the sleeves are mounted to the upper and lower ends of each of the rotor sections.

9. The assembly according to claim 6, wherein the outer diameters of the sleeves are spaced from inner edges of some of the stator disks by a small gap that creates a liquid film of the lubricant during operation.

10. The assembly according to claim 6, wherein each of the sleeves surrounds outer edges of some of the rotor disks.

11. An electric submersible well pump assembly, comprising:
    a rotary pump;
    an electrical motor connected to the pump for lowering into a well, the motor comprising:
    a motor housing filled with a dielectric lubricant and having a longitudinal axis;
    a stator formed of a stack of stator disks mounted within the motor housing, the stator having an inner diameter defining a stator bore;
    a motor shaft extending through the bore;
    a rotor mounted to the shaft for rotation therewith and comprising a stack of larger outer diameter and smaller outer diameter rotor disks;
    wherein the larger outer diameter rotor disks have greater outer diameters than the lesser outer diameter rotor disks to radially stabilize the shaft; wherein:
    the rotor is made up of rotor sections, each of the rotor sections containing a plurality of the larger diameter and the smaller diameter rotor disks sandwiched between end rings that are joined by conductor rods; and
    the larger outer diameter rotor disks are located adjacent each of the end rings.

* * * * *

UNITED STATES PATENT AND TRADEMARK OFFICE
CERTIFICATE OF CORRECTION

PATENT NO. : 9,624,938 B2
APPLICATION NO. : 14/020034
DATED : April 18, 2017
INVENTOR(S) : Forsberg Page 1 of 1

It is certified that error appears in the above-identified patent and that said Letters Patent is hereby corrected as shown below:

In the Claims

Column 6, Claim 7, Line 17, delete the word "with".

Signed and Sealed this
Seventeenth Day of April, 2018

Andrei Iancu
*Director of the United States Patent and Trademark Office*